(12) United States Patent
Oe (10) Patent No.: US 11,391,604 B2
(45) Date of Patent: Jul. 19, 2022

(54) SENSOR MODULE AND WIRELESS SENSOR DEVICE

(71) Applicant: SUMITOMO ELECTRIC INDUSTRIES, LTD., Osaka (JP)

(72) Inventor: Masanobu Oe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 140 days.

(21) Appl. No.: 16/090,630

(22) PCT Filed: Nov. 18, 2016

(86) PCT No.: PCT/JP2016/084294
§ 371 (c)(1),
(2) Date: Oct. 2, 2018

(87) PCT Pub. No.: WO2017/175415
PCT Pub. Date: Oct. 12, 2017

(65) Prior Publication Data
US 2019/0113372 A1    Apr. 18, 2019

(30) Foreign Application Priority Data

Apr. 5, 2016 (JP) .............................. JP2016-076213

(51) Int. Cl.
*G01D 11/30* (2006.01)
*G01H 17/00* (2006.01)

(52) U.S. Cl.
CPC ............. *G01D 11/30* (2013.01); *G01H 17/00* (2013.01)

(58) Field of Classification Search
CPC ....... G01H 17/00; G01D 11/30; G01D 11/305
See application file for complete search history.

(56) References Cited

U.S. PATENT DOCUMENTS

| 4,962,360 A * | 10/1990 | Homma ................. G01N 17/02 204/421 |
| 4,963,921 A * | 10/1990 | Kariya ...................... G03F 1/22 269/8 |
| 5,646,340 A * | 7/1997 | Gee .......................... G01H 1/00 340/441 |
| 5,675,154 A * | 10/1997 | Lindsay ................. B82Y 10/00 250/440.11 |
| 6,101,843 A * | 8/2000 | Nagano .................. A44C 9/003 63/15.3 |
| 6,102,785 A * | 8/2000 | Chandler ................ B24B 49/16 451/271 |

(Continued)

FOREIGN PATENT DOCUMENTS

| JP | S48-14125 Y | 4/1973 |
| JP | S60-1518 A | 1/1985 |

(Continued)

*Primary Examiner* — Lisa M Caputo
*Assistant Examiner* — Alex T Devito
(74) *Attorney, Agent, or Firm* — Faegre Drinker Biddle & Reath LLP (57) ABSTRACT

A sensor module according to one mode of the present disclosure includes a sensor part and a case configured to house the sensor part. The case includes: a contact part formed from an elastic body and including a contact surface with which to contact an installation target of the sensor module; and a magnet disposed along the contact surface of the contact part.

19 Claims, 7 Drawing Sheets

(56) References Cited

U.S. PATENT DOCUMENTS

2010/0265176 A1\* 10/2010 Olsson .................. G05G 9/047
345/161
2015/0302964 A1 10/2015 Bell et al.
2017/0197154 A1\* 7/2017 Bagley ................ A63H 33/046

FOREIGN PATENT DOCUMENTS

| JP | S60-29248 U1 | 2/1985 |
| JP | H04-348269 A | 12/1992 |
| JP | H06-25739 U | 4/1994 |
| JP | H07-139994 A | 6/1995 |
| JP | 2013-195173 A | 9/2013 |
| JP | 2015-19221 A | 1/2015 |

\* cited by examiner

SENSOR MODULE AND WIRELESS SENSOR DEVICE

TECHNICAL FIELD

The present invention relates to a sensor module and a wireless sensor apparatus.

This application claims priority on Japanese Patent Application No. 2016-076213 filed on Apr. 5, 2016, the entire contents of which are incorporated herein by reference.

BACKGROUND ART

As a system that uses a communication service such as a wireless LAN (local area network), an M2M (machine to machine) system is known (for example, see PATENT LITERATURE 1).

CITATION LIST

Patent Literature

PATENT LITERATURE 1: Japanese Laid-Open Patent Publication No. 2015-19221

SUMMARY OF INVENTION

According to a certain embodiment, a sensor module includes a sensor part and a case configured to house the sensor part. The case includes: a contact part formed from an elastic body and including a contact surface with which to contact an installation target of the sensor module; and a magnet disposed along the contact surface of the contact part.

According to another embodiment, a sensor module includes a sensor part and a case configured to house the sensor part. The case includes three or more magnets disposed at an end, on a side contacting an installation target, of the sensor module, the three or more magnets each having a shape including a curved surface protruding to an opposite side to the sensor part.

According to another embodiment, a wireless sensor apparatus includes: the sensor module described above; and a wireless terminal device connected to the sensor module and configured to transmit a signal through wireless communication on the basis of information obtained from the sensor module.

DESCRIPTION OF EMBODIMENTS

Problems to be Solved by the Present Disclosure

In the M2M system, apparatuses each having a wireless device mounted therein transmit/receive information not via persons, and information such as vibration, temperature, or the like of a machine operating in a plant, for example, is detected by a sensor module to be automatically reported to a server. In order to monitor the operation state of each of a large number of machines in a plant by use of such an M2M system, the sensor module needs to be installed at various places in the plant, such as on the surface and the like of various machines, for example.

Surfaces of machines or the like to which the sensor module is to be installed come in a variety of shapes. For example, when the surface of an installation target is a flat surface, the shape of the contact surface, of the sensor module, which is the face that comes into contact with the installation target can be flat. When the surface of an installation target is a cylindrical surface, the shape of the contact surface of the sensor module can be cylindrical.

However, when such a sensor module having a contact surface that is adjusted to respective various surface shapes of installation targets is employed, there is a problem that the versatility of the sensor module is reduced.

Therefore, in a certain aspect of the present disclosure, an object is to provide a sensor module that can be easily installed to installation targets having various surface shapes, and a wireless sensor apparatus including the sensor module.

Effects of the Present Disclosure

According to this disclosure, a sensor module that can be easily installed to installation targets having various surface shapes can be provided.

OUTLINE OF EMBODIMENTS

First, embodiments of the present disclosure are listed to be described.

A sensor module according to one aspect of the present disclosure includes a sensor part and a case configured to house the sensor part. The case includes: a contact part formed from an elastic body and including a contact surface with which to contact an installation target of the sensor module; and a magnet disposed along the contact surface of the contact part.

In the sensor module according to the one aspect above, the magnet is disposed along the contact surface of the contact part. This enables installation by magnetic force to the installation target formed from a magnetic body. In addition, in the sensor module according to the one aspect above, the contact part is formed from an elastic body. Therefore, when the sensor module is to be installed to an installation target, the elastic body deforms into a shape that corresponds to the surface of the installation target. As a result, the sensor module can be stably installed to an installation target having a variety of surface shapes. Therefore, according to the sensor module of the one aspect above, a sensor module that can be easily installed to installation targets having various surface shapes can be provided.

In the sensor module according to the one aspect above, the case may include three or more of the magnet. This enables more stable installation by magnetic force to the installation target formed from a magnetic body.

A sensor module according to another aspect of the present disclosure includes a sensor part and a case configured to house the sensor part. The case includes three or more magnets disposed at an end, on a side contacting an installation target, of the sensor module, the three or more magnets each having a shape including a curved surface protruding to an opposite side to the sensor part.

In the sensor module according to another aspect above, the magnets are disposed at the end, on the side contacting the installation target, of the case. This enables installation by magnetic force to the installation target formed from a magnetic body. In the sensor module in another aspect above, three or more magnets each having a shape including a curved surface protruding to the opposite side to the sensor part are employed. As a result of the presence of the three or more magnets and each magnet having such a curved surface, the sensor module can be stably installed to an installation target having a variety of surface shapes. Therefore, according to the sensor module of another aspect above, a sensor module that can be easily installed to installation targets having various surface shapes can be provided.

In the sensor module according to another aspect above, the case may further include a contact part formed from an elastic body and including a contact surface with which to contact the installation target of the sensor module. Accordingly, when the sensor module is to be installed to an installation target, the elastic body deforms into a shape that corresponds to the surface of the installation target. As a result, the sensor module can be stably installed to an installation target having a variety of surface shapes.

In the sensor module above, in a plan view of a face where all of the magnets are disposed, the center of gravity of the sensor part may be located inside a polygon obtained by connecting predetermined positions of all of the magnets. Accordingly, the sensor part in the case can be more stably held.

In the sensor module above, the magnet may be held so as to be rotatable about the center of gravity of the magnet. Accordingly, when the sensor module is to be installed, the magnet rotates and a magnetic field appropriate for installation of the sensor module is formed.

In the sensor module above, the case may further include a magnet holding part configured to hold the magnet. The magnet holding part may be formed from a magnetic body. Accordingly, assembly of the sensor module is facilitated.

In the sensor module above, the case may further include a magnet holding part configured to hold the magnet. The magnet holding part may be formed from a non-magnetic body. Accordingly, the magnet can easily rotate in the sensor module such that the magnet forms an appropriate magnetic field.

In the sensor module above, the sensor part may be a vibration sensor part configured to detect vibration. The sensor module above is suitable for a sensor module including a vibration sensor part.

In the sensor module above, the magnet may have a spherical shape. Accordingly, the sensor module can be more stably installed to an installation target having a variety of surface shapes.

A wireless sensor apparatus according to one aspect of the present disclosure includes: the sensor module described above; and a wireless terminal device connected to the sensor module and configured to transmit a signal through wireless communication on the basis of information obtained from the sensor module. According to the wireless sensor apparatus of the present application, a signal based on information from the sensor module installed to each of installation targets having various surface shapes can be transmitted through wireless communication.

Details of Embodiments of the Present Invention

Hereinafter, embodiments of the sensor module and the wireless sensor apparatus according to the present disclosure will be described with reference to the drawings. In the drawings, the same or corresponding parts are denoted by the same reference signs, and descriptions thereof are not repeated.

Embodiment 1

Figure 1:
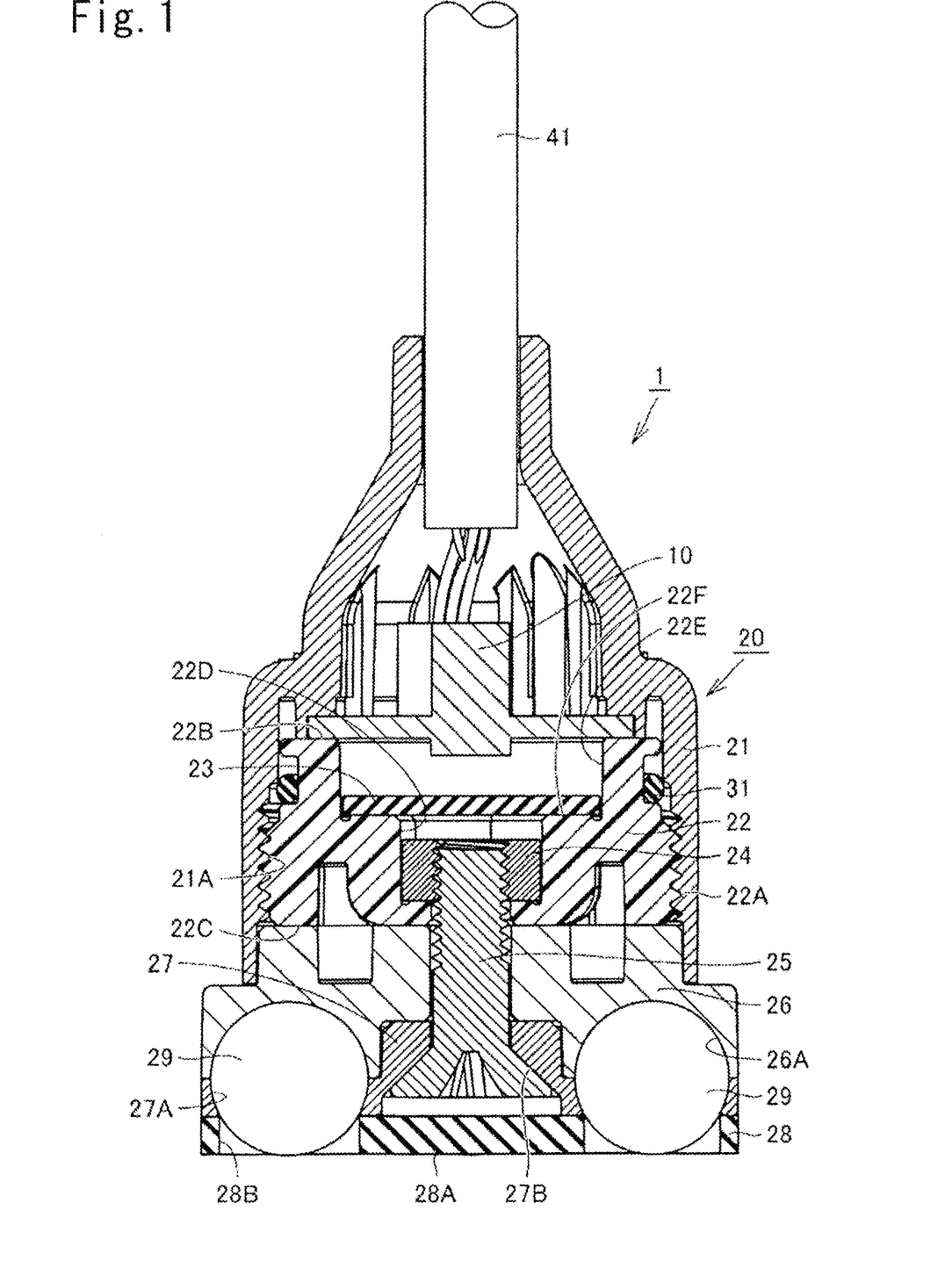
FIG. 1 is a schematic cross-sectional view showing a structure of a sensor module in Embodiment 1.
Figure 2:
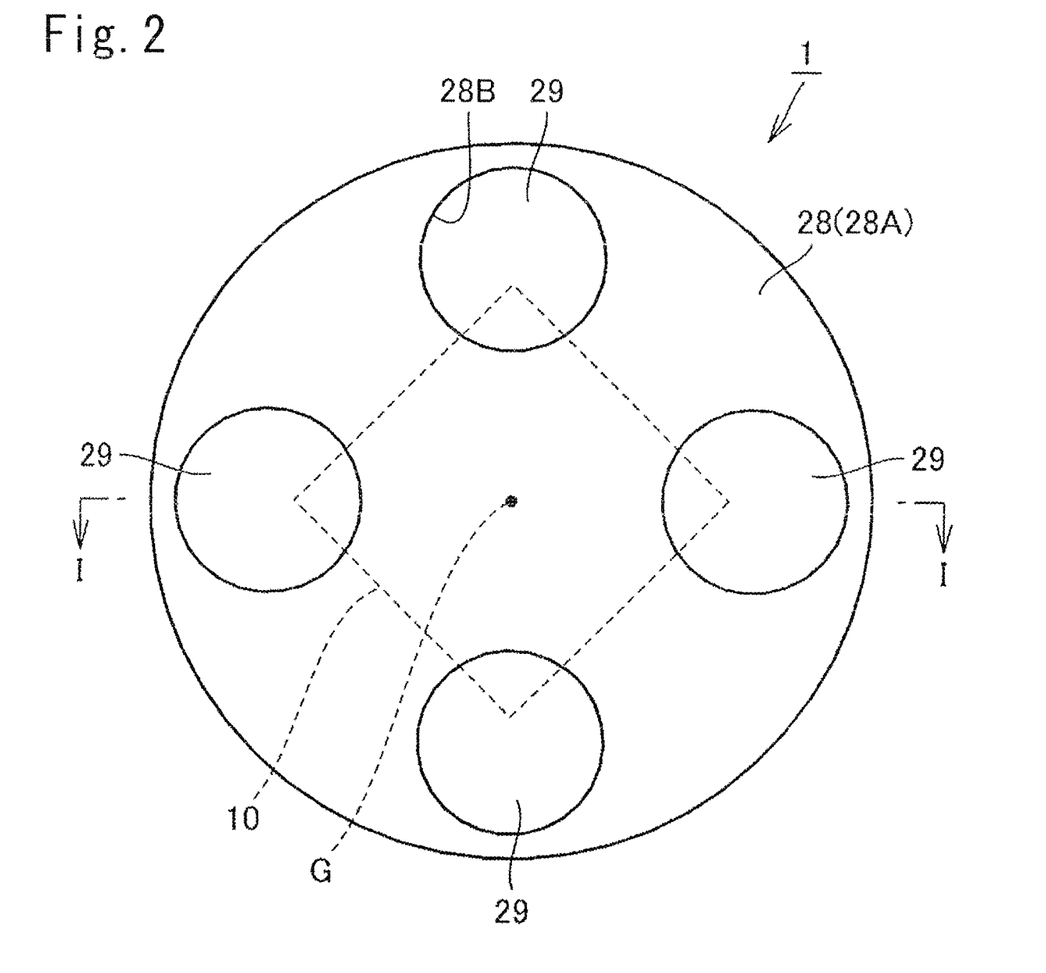
FIG. 2 is a schematic plan view showing the structure of the sensor module in Embodiment 1.

With reference to FIG. 1 and FIG. 2, a sensor module 1 in Embodiment 1 is described. FIG. 1 corresponds to the cross-sectional view along the line I-I shown in FIG. 2. The sensor module 1 includes a sensor part 10 and a case 20 which houses the sensor part 10. The sensor part 10 has a structure in which a sensor is mounted on a printed circuit, for example. The sensor disposed on the printed circuit is, for example, a vibration sensor, a temperature sensor, or the like. That is, the sensor part 10 is, for example, a vibration sensor part which detects vibration, a temperature sensor part which detects temperature, or the like.

The case 20 includes a housing 21, a support member 22, a packing sheet 23, a nut 24, a flat head screw 25, a first holding member 26, a second holding member 27, an elastic sheet 28, spherical magnets 29, and an O-ring 31. The housing 21 has a hollow cylindrical shape. The housing 21 houses the sensor part 10 in an inner space thereof. A housing joining part 21A, which is an area where a screw thread is formed, is formed on the inner wall of the housing 21.

A wire 41 is connected to the housing 21. The wire 41 is electrically connected to the sensor part 10, and transmits information obtained in the sensor part 10, as an electric signal.

The support member 22 has a cylindrical shape. The support member 22 supports the sensor part 10 in the inner space of the housing 21. A support member joining part 22A, which is an area where a screw thread is formed, is formed on the outer peripheral surface of the support member 22. By the support member 22 being screwed into the housing 21, the support member joining part 22A and the housing joining part 21A mesh each other. As a result, the support member 22 is fixed relative to the housing 21. A support face 22B, which is one end face of the support member 22, contacts the sensor part 10, whereby the support member 22 supports the sensor part 10.

The inner peripheral surface of the support member 22 includes: a large-diameter portion 22E connected to the support face 22B; a small-diameter portion 22D having a smaller diameter than the large-diameter portion 22E; and a step face 22F which crosses (is orthogonal to) the large-diameter portion 22E and the small-diameter portion 22D and which connects the large-diameter portion 22E and the small-diameter portion 22D. The packing sheet 23 having a disk-like shape and having a diameter corresponding to the large-diameter portion 22E is disposed in the space surrounded by the large-diameter portion 22E. The packing sheet 23 is supported by the step face 22F. The packing sheet 23 is formed from rubber, for example. By the packing sheet 23 being disposed, water and the like that have entered the inner peripheral area of the support member 22 are inhibited from reaching the sensor part 10. The nut 24 is disposed in the space surrounded by the small-diameter portion 22D. The O-ring 31 is disposed between the outer peripheral surface of the support member 22 and the inner peripheral surface of the housing 21. The O-ring 31 is formed from rubber, for example. By the O-ring 31 being disposed, water and the like that have entered between the support member 22 and the housing 21 are inhibited from reaching the sensor part 10.

The first holding member 26 has an annular shape. The first holding member 26 contacts, at one end face thereof, an end face 22C at the opposite side to the support face 22B of the support member 22. The first holding member 26 has, at the other end face thereof, first magnet holding faces 26A, which are each a concave face having a shape corresponding to a spherical magnet 29.

The second holding member 27 has an annular and plate-like shape. In the second holding member 27, through-holes each surrounded by a second magnet holding face 27A which holds a spherical magnet 29 are formed. The second holding member 27 is disposed so as to be laid on and in contact with the end face at the opposite side to the support member 22 of the first holding member 26. When viewed in a planar manner, the first holding member 26 and the second holding member 27 are disposed such that the area surrounded by each first magnet holding face 26A and the area surrounded by each second magnet holding face 27A overlap each other. The first magnet holding faces 26A and the second magnet holding faces 27A are formed so as to correspond to the vertexes of a square when viewed in a planar manner.

In the present embodiment, four spherical magnets 29 are disposed. The four spherical magnets 29 are held by the four first magnet holding faces 26A and the four second magnet holding faces 27A described above. As a result, when viewed in a planar manner, the four spherical magnets 29 are disposed so as to be located at the vertexes of a square. Specifically, the spherical magnets 29 are disposed such that predetermined positions of the four spherical magnets 29 are located at the vertexes of a square, respectively. The predetermined positions are the centers of the respective four spherical magnets 29, for example.

The flat head screw 25 penetrates the inner peripheral area of the second holding member 27 and the inner peripheral area of the first holding member 26 and a leading end portion of the flat head screw 25 is screwed into the nut 24 held in the space surrounded by the small-diameter portion 22D of the support member 22. The head of the flat head screw 25 is supported by a tapered face 27B formed at the inner peripheral surface of the second holding member 27. Accordingly, the first holding member 26 and the second holding member 27 are fixed relative to the support member 22.

The elastic sheet 28 has a disk-like shape. The elastic sheet 28 is formed from an elastic body. In the present embodiment, the elastic sheet is formed from rubber which is an elastic body. Four annular walls 28B each surrounding a space in a disk-like shape are formed in the elastic sheet 28. Part of each spherical magnet 29 enters the space surrounded by a corresponding annular wall 28B. The elastic sheet 28 is, at one main surface thereof, adhered and fixed to the second holding member 27, for example. Another main surface, at the opposite side to the second holding member 27, of the elastic sheet 28 is a contact surface 28A with which to contact an installation target of the sensor module 1. The elastic sheet 28 serves as a contact part. Each spherical magnet 29 is disposed along the contact surface 28A.

It is assumed that the sensor module 1 in Embodiment 1 is usually handled such that the contact surface 28A serves as the bottom face. Therefore, FIG. 2, which is a schematic plan view of the sensor module 1 in Embodiment 1, is a diagram obtained when the sensor module 1 is placed such that the contact surface 28A as the bottom face is aligned with the horizontal plane and the sensor module 1 is viewed from just above the bottom face perpendicularly thereto. Also in the embodiments below, schematic plan views of the sensor module 1 are those obtained in a similar manner. "Viewed in a planar manner" has the same meaning as "seen in a plan view" in this description, and in particular, means to see the face of the target from a direction perpendicular to the bottom face.

In the sensor module 1, magnets are disposed along the contact surface 28A. This enables installation by magnetic force to an installation target formed from a magnetic body. In the sensor module 1, the contact part is implemented by the elastic sheet 28 formed from rubber. Therefore, when the sensor module 1 is to be installed to an installation target, the elastic sheet 28 deforms into a shape that corresponds to the surface of the installation target. As a result, the sensor module 1 can be stably installed to an installation target having a variety of surface shapes. Therefore, the sensor module 1 is a sensor module that can be easily installed to installation targets having various surface shapes.

In the present embodiment, the elastic sheet 28 formed from rubber is employed. Accordingly, the coefficient of friction (coefficient of static friction) between the elastic sheet 28 and the installation target is large. As a result, the sensor module 1 can be firmly fixed to the installation target.

With reference to FIG. 2, in the sensor module 1 of the present embodiment, when viewed in a planar manner, the center of gravity G of the sensor part 10 is located inside a polygon obtained by connecting predetermined positions (for example, the centers) of all of a plurality of (four in the present embodiment) spherical magnets 29. Accordingly, the sensor part 10 in the case 20 can be more stably held.

The first holding member 26 and the second holding member 27 as a magnet holding part may be formed from a magnetic body. Accordingly, assembly of the sensor module 1 is facilitated. More specifically, as a result of at least one of the first holding member 26 and the second holding member 27 being formed from a magnetic body, if assembly is performed in a state in which the spherical magnets 29 are disposed at portions where the spherical magnets 29 should be held in the one of the first holding member 26 and the second holding member 27 and the spherical magnets 29 are held by magnetic force, the assembly can be smoothly performed.

Meanwhile, the first holding member 26 and the second holding member 27 as a magnet holding part may be formed from a non-magnetic body. Accordingly, the spherical magnets 29 can easily rotate in the sensor module 1 such that the spherical magnets 29 form an appropriate magnetic field.

In the above embodiment, a case in which the first holding member 26 and the second holding member 27 are fixed relative to the support member 22 by means of the nut 24 and the flat head screw 25 has been described. However, the fixing method is not limited thereto, and the fixation may be performed by another method.

Figure 3:
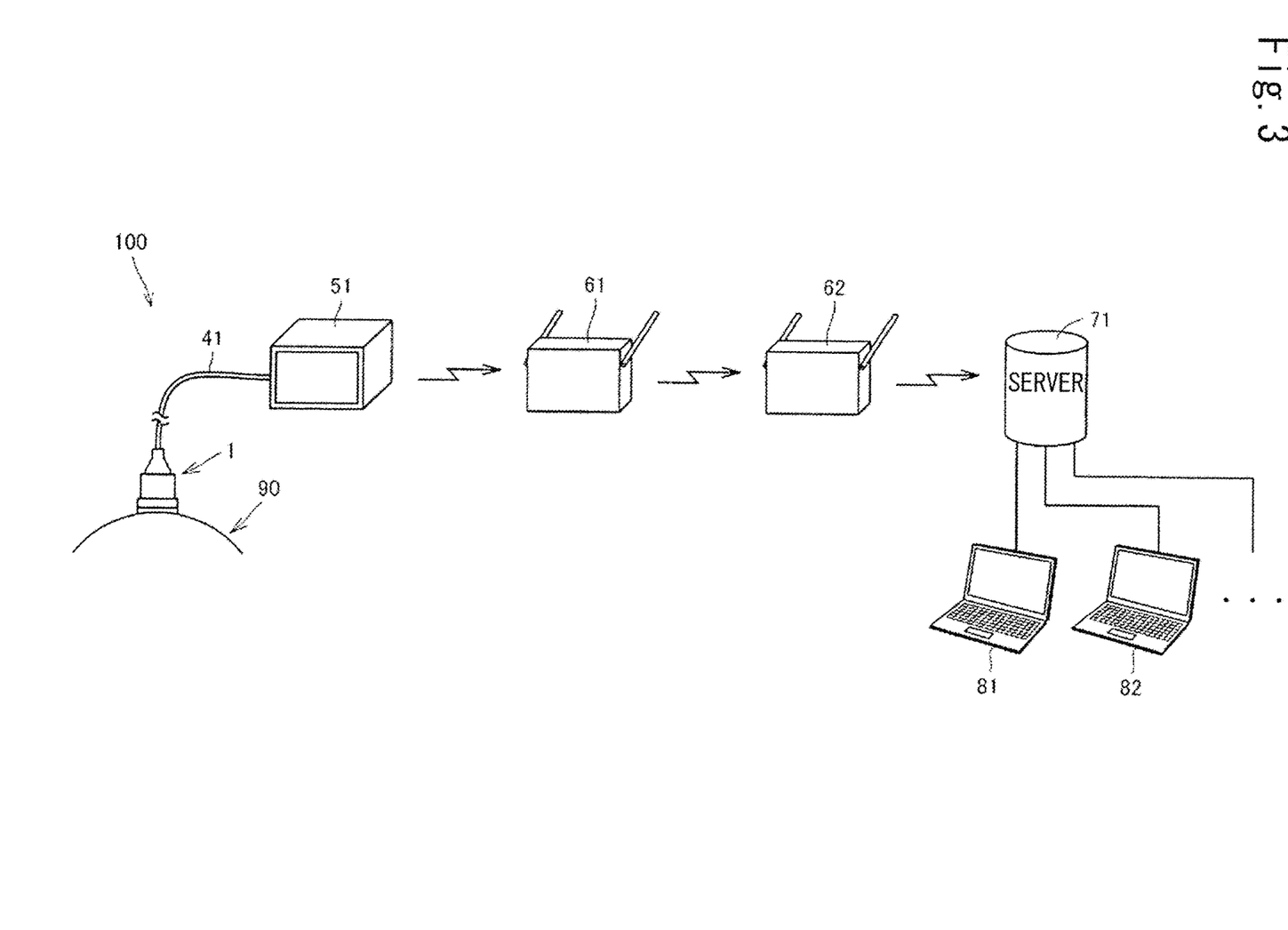
FIG. 3 is a schematic diagram showing a configuration of a vibration monitoring system including a wireless sensor apparatus.

Next, one example of a wireless sensor apparatus including the sensor module 1 and a monitoring system including the wireless sensor apparatus is described. With reference to FIG. 3, the monitoring system of the present embodiment is a vibration monitoring system which monitors, in terms of vibration, the operation state of a machine in a plant. This vibration monitoring system includes a wireless sensor apparatus 100, a first access point 61, a second access point 62, a server 71, and client computers 81, 82.

The wireless sensor apparatus 100 includes: the sensor module 1; and a wireless terminal device 51 which is connected to the sensor module 1 by the wire 41 and which transmits a signal through wireless communication on the basis of information obtained from the sensor module 1. The sensor module 1 is installed to a machine 90 which is an installation target (monitoring target). In this case, the sensor part 10 included in the sensor module 1 is a vibration sensor part.

Information regarding the vibration state of the machine 90 and obtained by the sensor part 10 in the sensor module 1 is transmitted to the wireless terminal device 51 via the wire 41. The wireless terminal device 51 having received the information transmits a signal including information regarding vibration on the basis of the information, to the first access point 61 through wireless communication. The first access point 61 having received the signal transmits the signal to the second access point 62 through wireless communication. The second access point 62 having received the signal transmits the signal to the server 71 through wireless communication. The server 71 having received the signal stores therein information regarding vibration obtained on the basis of the signal. The vibration monitoring system includes, in addition to the above, a large number of wireless sensor apparatuses 100 and access points, signals each including information regarding vibration of a corresponding machine serving as a monitoring target in the plant are transmitted to the server 71, and information regarding vibration and obtained on the basis of each signal is stored in the server 71. In addition to the client computers 81, 82, a large number of client computers installed at various places are connected to the server 71. The server 71 has stored therein software for displaying the stored information regarding vibration on a large number of client computers including the client computers 81, 82. As a result, the vibration state of a machine serving as a monitoring target in the plant can be monitored at client computers installed at various places.

In the above embodiment, a case in which the sensor module 1 including the vibration sensor part is connected to the wireless terminal device 51 has been described. However, instead of the sensor module 1 including the vibration sensor part, or in addition to the sensor module 1 including the vibration sensor part, a sensor module including another sensor part, such as a sensor module 1 including a temperature sensor part, may be connected.

Embodiment 2

Figure 4:
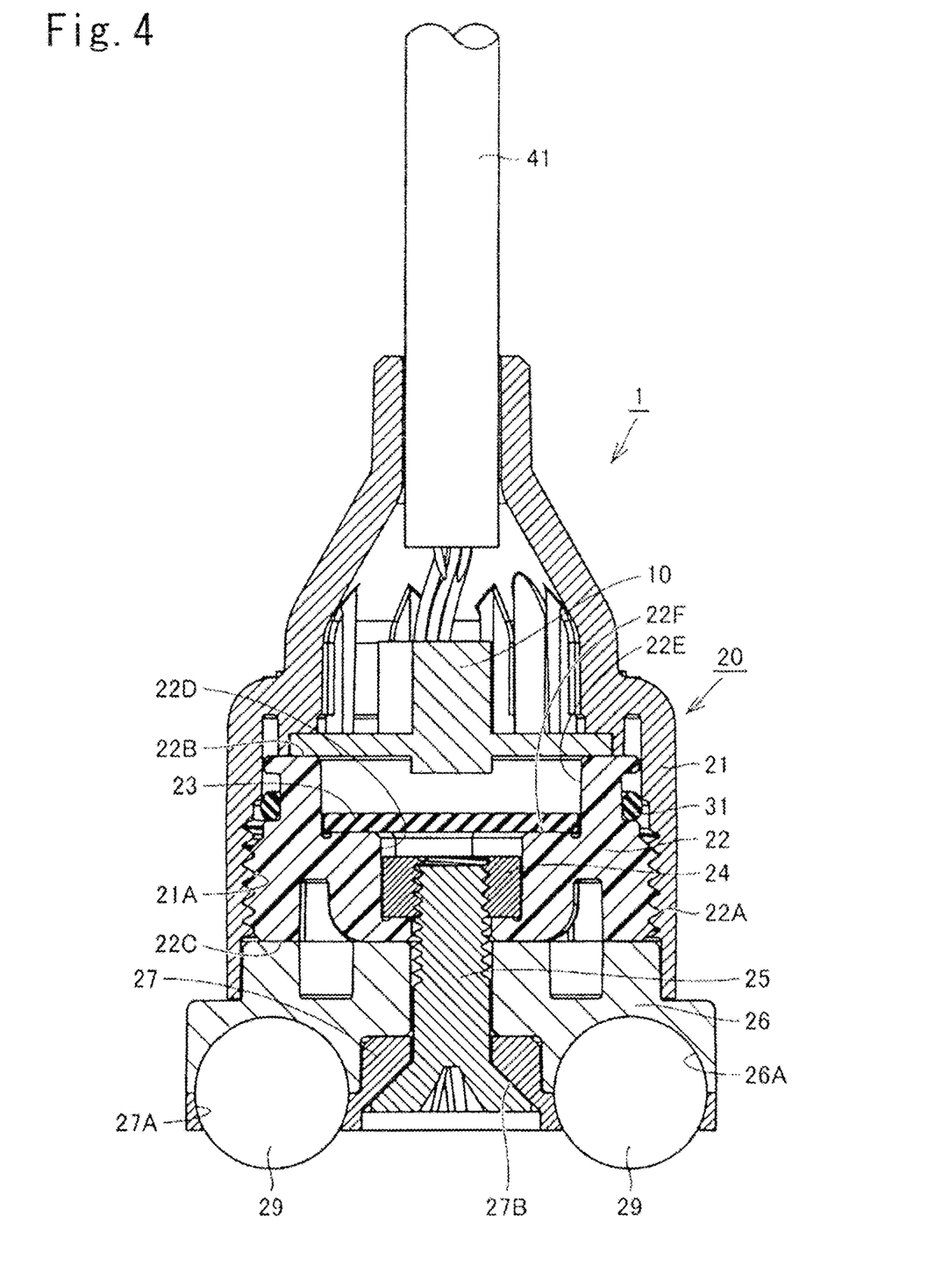
FIG. 4 is a schematic cross-sectional view showing a structure of a sensor module in Embodiment 2.
Figure 5:
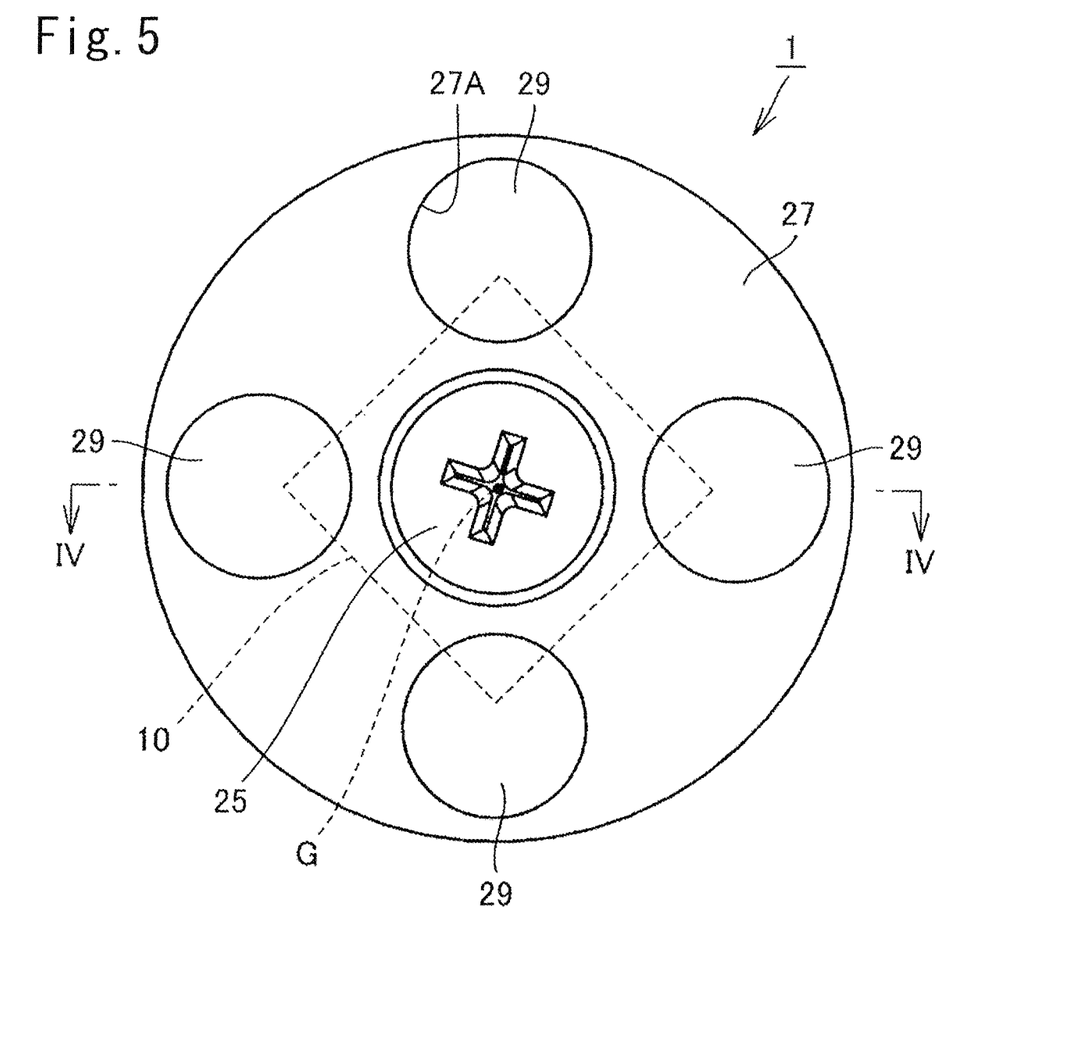
FIG. 5 is a schematic plan view showing the structure of the sensor module in Embodiment 2.

Next, with reference to FIG. 4 and FIG. 5, a sensor module 1 in Embodiment 2 is described. The sensor module 1 in Embodiment 2 basically has a structure similar to that of the sensor module 1 in Embodiment 1. However, the sensor module 1 in Embodiment 2 is different from the sensor module 1 in Embodiment 1 in that the elastic sheet 28 is not employed.

The case 20 of the sensor module 1 in the present embodiment includes three or more spherical magnets 29 which are disposed at the end, on the side contacting the installation target, of the sensor module 1 and which each include a curved surface protruding to the opposite side to the sensor part 10. Usually, the sensor module 1 in Embodiment 2 is handled such that the end, on the side contacting the installation target, of the sensor module 1 serves as the bottom face.

In the sensor module 1 in Embodiment 2, each spherical magnet 29 is disposed at the end, on the side contacting the installation target, of the case 20. This enables installation by magnetic force to an installation target formed from a magnetic body. In the sensor module 1 in Embodiment 2, three or more (four in the present embodiment) spherical magnets 29 each having a shape including a curved surface protruding to the opposite side to the sensor part 10 are employed. As a result of the presence of three or more spherical magnets 29 and each spherical magnet 29 having such a curved surface, the sensor module 1 can be stably installed to an installation target having a variety of surface shapes. Therefore, the sensor module 1 in Embodiment 2 is a sensor module that can be easily installed to installation targets having various surface shapes.

In the sensor module 1 in Embodiment 2, when viewed in a planar manner as shown in FIG. 5, the center of gravity G of the sensor part 10 may be located inside a polygon obtained by connecting predetermined positions (for example, the centers) of all of a plurality of (four in the present embodiment) spherical magnets 29. Accordingly, the sensor part 10 in the case 20 can be more stably held.

Embodiment 3

Figure 6:
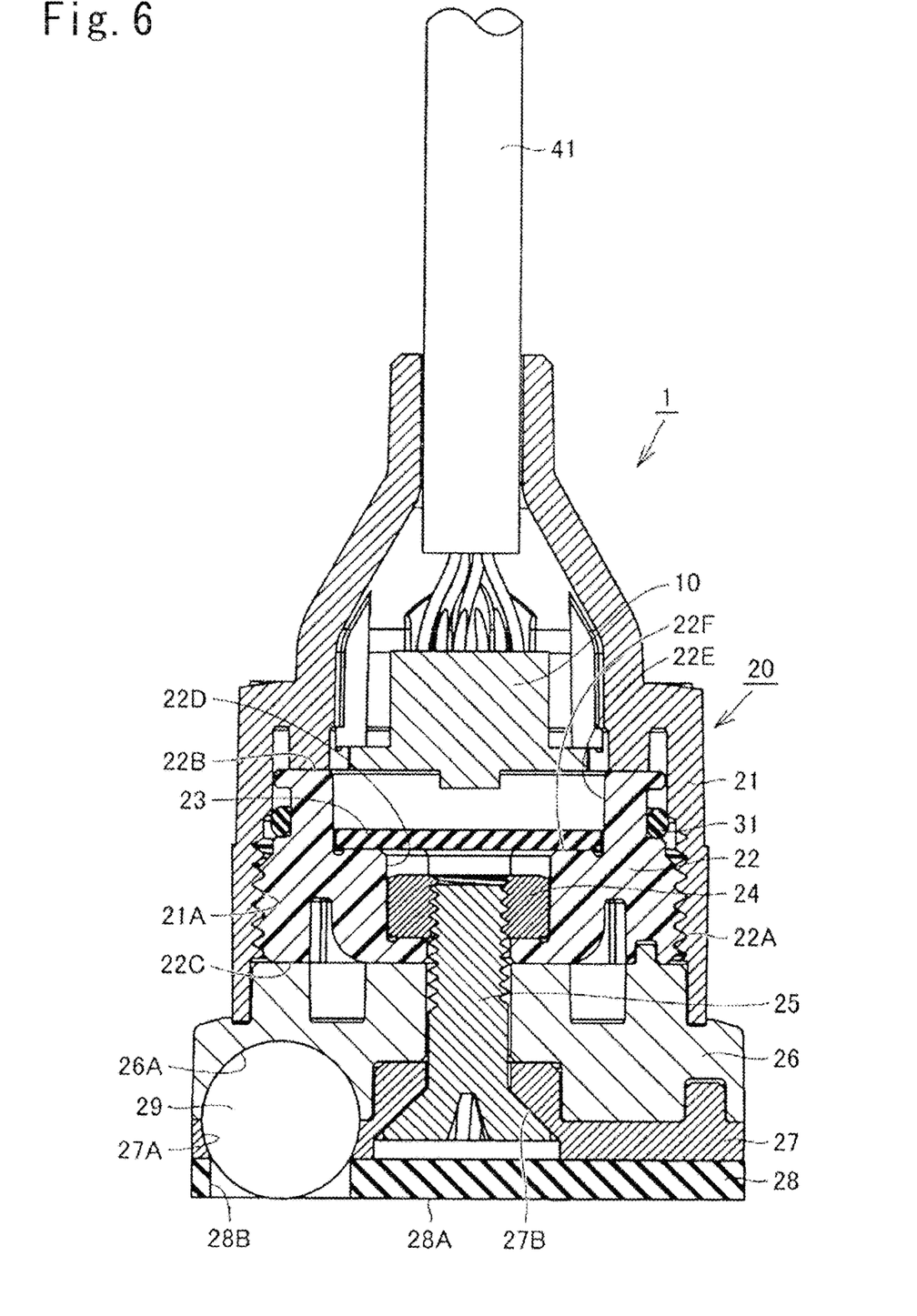
FIG. 6 is a schematic cross-sectional view showing a structure of a sensor module in Embodiment 3.
Figure 7:
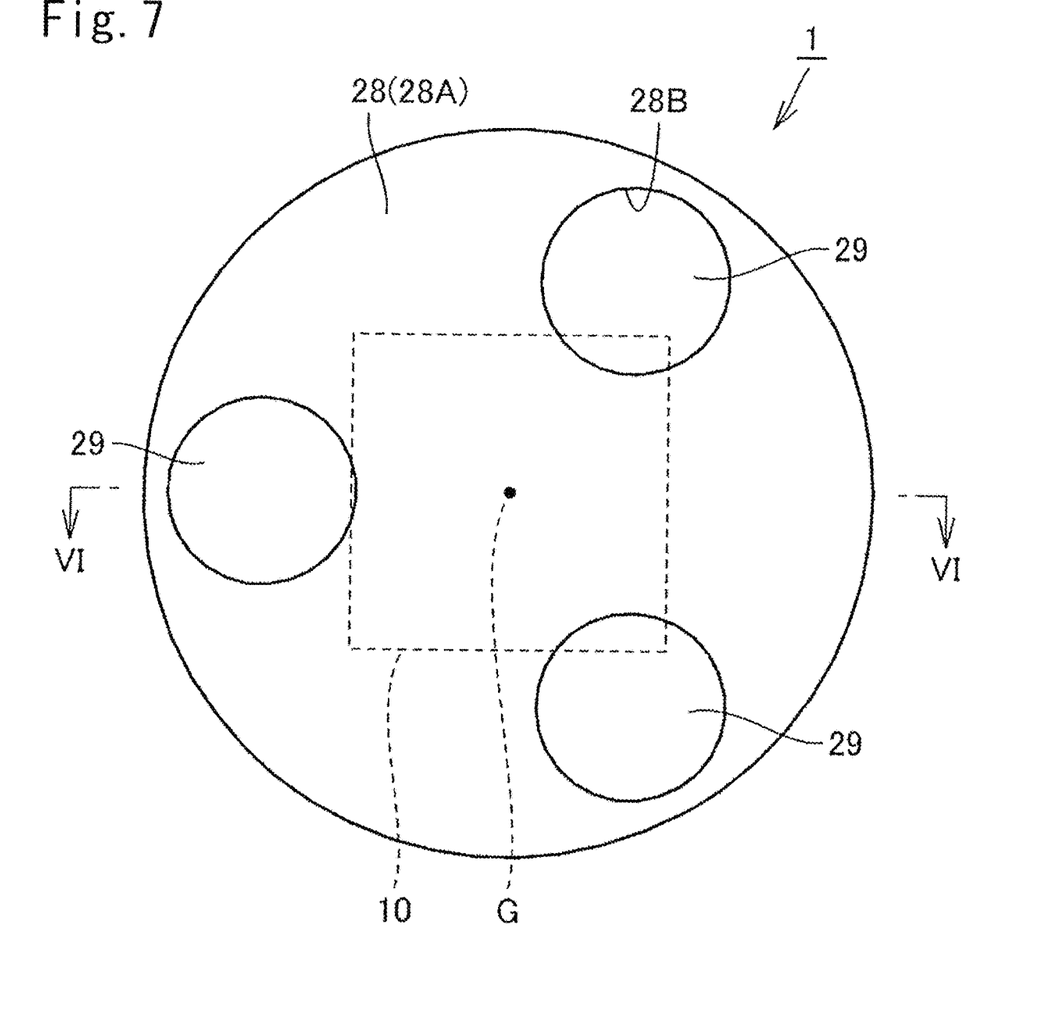
FIG. 7 is a schematic plan view showing the structure of the sensor module in Embodiment 3.

Next, with reference to FIG. 6 and FIG. 7, a sensor module 1 in Embodiment 3 is described. The sensor module 1 in Embodiment 3 basically has a structure similar to that of the sensor module 1 in Embodiment 1. However, the sensor module 1 in Embodiment 3 is different from the sensor module 1 in Embodiment 1 in that the number of spherical magnets 29 employed is three.

Specifically, with reference to FIG. 6 and FIG. 7, when viewed in a planar manner, the spherical magnets 29 are disposed so as to be located at the vertexes of an equilateral triangle. Specifically, the spherical magnets 29 are disposed such that predetermined positions of the three spherical magnets 29 are located at the vertexes of an equilateral triangle, respectively. The predetermined positions are the centers of the respective three spherical magnets 29, for example. Also with the sensor module 1 having this structure, effects similar to those in Embodiment 1 can be obtained.

In the above embodiment, a case in which the spherical magnets 29 having the same size are employed has been described. However, the spherical magnets 29 may have different sizes.

In the above Embodiments 1 and 3, cases in which four or three spherical magnets 29 are employed have been described. However, the number of spherical magnets 29 to be employed may be one or two, or may be five or more. From the viewpoint of obtaining appropriate magnetic force without making the structure more complicated than necessary, the number of spherical magnets 29 is preferably three or four. Instead of the spherical magnet 29, a magnet having another shape may be employed.

In Embodiment 2, a case in which four spherical magnets 29 are employed has been described. However, the number of spherical magnets 29 to be employed can be any number that is three or greater. From the viewpoint of obtaining appropriate magnetic force without making the structure more complicated than necessary, the number of spherical magnets 29 is preferably three or four.

As described above, the present application relates to a sensor module including a sensor part. However, if a transmitter-receiver is housed in a case having a similar structure, an access point having high installability can be configured.

It should be noted that the embodiments disclosed herein are merely illustrative in all aspects and should not be recognized as being restrictive in any aspect. The scope of the present invention is defined not by the above description but by the scope of the claims and is intended to include meaning equivalent to the scope of the claims and all modifications within the scope.

REFERENCE SIGNS LIST 1 sensor module
10 sensor part
100 wireless sensor apparatus
20 case
21 housing
21A housing joining part
22 support member
22A support member joining part
22B support face
22C end face
22D small-diameter portion
22E large-diameter portion
22F step face
23 packing sheet
24 nut
25 flat head screw
26 holding member
26A magnet holding face
27 holding member
27A magnet holding face
27B tapered face
28 elastic sheet
28A contact surface
28B annular wall
29 spherical magnet
31 O-ring
41 wire
51 wireless terminal device
61 first access point
62 second access point
71 server
81, 82 client computer
90 machine

The invention claimed is:

1. A sensor module comprising:
a sensor part; and
a case configured to house the sensor part, wherein the case includes:
an elastic sheet formed from rubber and including a flat contact surface;
a plurality of magnets disposed along the flat contact surface of the elastic sheet;
a first holding member for holding the plurality of magnets; and
a second holding member for holding the plurality of magnets in a portion closer to an installation target of the sensor module than to the first holding member,
wherein each of the plurality of magnets comprises a spherical shape and is held so as to be rotatable about a center of gravity of each magnet by holding, by the first holding member, a first hemisphere on an opposite side of each magnet from the installation target and by holding, by the second holding member, a second hemisphere adjacent to the installation target with part of the second hemisphere protruding toward a portion closer to the installation target than to the second holding member, the elastic sheet is disposed on a surface of the second holding member closer to the installation target, a plurality of spaces surrounded by respective annular walls are formed in the elastic sheet, the plurality of magnets having portions protruding toward a portion closer to the installation target than to the second holding member are disposed along the flat contact surface by entering each magnet of the portions of the plurality of magnets into a corresponding space of the plurality of spaces, and
a part of the flat contact surface is positioned in a region that is closer to an inner periphery of the sensor module than the annular walls are to the inner periphery.

2. The sensor module according to claim 1, wherein the magnet is held so as to be rotatable about a center of gravity of the plurality of magnets.

3. The sensor module according to claim 1, wherein the case further includes a magnet holding part configured to hold the plurality of magnets, and the magnet holding part is formed from a magnetic body.

4. The sensor module according to claim 1, wherein the case further includes a magnet holding part configured to hold the plurality of magnets, and the magnet holding part is formed from a non-magnetic body.

5. The sensor module according to claim 1, wherein the sensor part is a vibration sensor part configured to detect vibration.

6. The sensor module according to claim 1, wherein each magnet of the plurality of magnets has a maximum diameter greater than an inner diameter of each annular wall.

7. A wireless sensor apparatus comprising:
the sensor module according to claim 1; and
a wireless terminal device connected to the sensor module and configured to transmit a signal through wireless communication on the basis of information obtained from the sensor module.

8. The sensor module according to claim 1, wherein the plurality of magnets include three or more magnets.

9. The sensor module according to claim 8, wherein in a plan view, a center of gravity of the sensor part is located inside a polygon obtained by connecting positions of the three or more magnets.

10. A sensor module comprising:
a sensor part; and
a case configured to house the sensor part, wherein the case includes:
an elastic sheet formed from an elastic body and including a flat contact surface, the elastic sheet fixing the sensor module to an installation target of the sensor module by friction; and
a plurality of magnets disposed along the flat contact surface of the elastic sheet;
a first holding member for holding the plurality of magnets; and
a second holding member for holding the plurality of magnets in a portion closer to the installation target than to the first holding member,
wherein each of the plurality of magnets comprises a spherical shape and is held so as to be rotatable about a center of gravity of each magnet by holding, by the first holding member, a first hemisphere on an opposite side of each magnet from the installation target and by holding, by the second holding member, a second hemisphere adjacent to the installation target with part of the second hemisphere protruding toward a portion closer to the installation target than to the second holding member, the elastic sheet is disposed on a surface of the second holding member closer to the installation target, a plurality of spaces surrounded by respective annular walls are formed in the elastic sheet, the plurality of magnets having portions protruding toward a portion closer to the installation target than to the second holding member are disposed along the flat contact surface by entering each magnet of the portions of the plurality of magnets into a corresponding space of the plurality of spaces, a part of the flat contact surface is positioned in a region that is closer to an inner periphery of the sensor module that the annular walls are to the inner periphery.

11. A wireless sensor apparatus comprising:

the sensor module according to claim 10; and a wireless terminal device connected to the sensor module and configured to transmit a signal through wireless communication on the basis of information obtained from the sensor module.

12. The sensor module according to claim 10, wherein the sensor part is a vibration sensor part configured to detect vibration.

13. The sensor module according to claim 10, wherein the plurality of magnets include three or more magnets.

14. The sensor module according to claim 13, wherein in a plan view, a center of gravity of the sensor part is located inside a polygon obtained by connecting positions of the three or more magnets.

15. A sensor module comprising:

a sensor part; and a case configured to house the sensor part, wherein the case includes three or more magnets disposed at least partially within an end, on a side contacting an installation target, of the sensor module, the three or more magnets each having a shape including a curved surface protruding to an opposite side to the sensor part;

a first holding member for holding the three or more magnets; and a second holding member for holding the three or more magnets in a portion closer to the installation target than to the first holding member, wherein each of the three or more magnets comprises a spherical shape and is held so as to be rotatable about a center of gravity of each magnet by holding, by the first holding member, a first hemisphere on an opposite side of each magnet from the installation target and by holding, by the second holding member, a second hemisphere adjacent to the installation target with part of the second hemisphere protruding toward a portion closer to the installation target than to the second holding member.

16. The sensor module according to claim 15, wherein the case further includes an elastic sheet formed from an elastic body.

17. A wireless sensor apparatus comprising:

the sensor module according to claim 15; and a wireless terminal device connected to the sensor module and configured to transmit a signal through wireless communication on the basis of information obtained from the sensor module.

18. The sensor module according to claim 15, wherein the sensor part is a vibration sensor part configured to detect vibration.

19. The sensor module according to claim 15, wherein in a plan view, a center of gravity of the sensor part is located inside a polygon obtained by connecting positions of the three or more magnets.

* * * * *